UNITED STATES PATENT OFFICE.

ANTONIO CASADEY, OF PHILADELPHIA, PENNSYLVANIA.

IMPROVED ARTIFICIAL STONE.

Specification forming part of Letters Patent No. 52,386, dated February 6, 1866.

*To all whom it may concern:*

Be it known that I, ANTONIO CASADEY, of Philadelphia, Pennsylvania, have invented an Improved Artificial Stone; and I do hereby declare the following to be a full, clear, and exact description of the mode of making the same.

A block of gypsum to be made into artificial stone is first heated in an oven until perfectly calcined. The block is then exposed to the air in a dry room for from one to twenty days, as may be found best, after which it is deposited in a bath consisting of an aqueous solution of alum and carbonate of potassa. After remaining in the bath for from twenty-four to forty-eight hours the block is withdrawn and exposed to the air until dry, when it will be found to have become sufficiently hardened to receive a high polish. It may then be cut to any desired shape in the same manner as ordinary marble.

The block may be cut to the form desired before being treated as above, and I have found that excellent imitations of colored marbles and fancy stones may be made by introducing various coloring-matters into the bath in which the block is deposited, the coloring-matter penetrating the natural veins of the gypsum, so that when the block is polished it represents most elaborately and beautifully veined marbles.

Various substances may be substituted for the alum and potassa specified as being used in the bath, as, for instance, oxide of zinc, soda, or sulphate of copper, and I have found that some well or river waters possess of themselves the property of hardening the gypsum.

Without confining myself to the precise mode described or to the materials used in preparing the bath,

I claim as my invention and desire to secure by Letters Patent—

1. An artificial stone made from gypsum by calcining the same and subjecting it to the action of a chemical bath, substantially as herein described.

2. Imparting to the gypsum the appearance of veined marble or fancy stones by introducing coloring-matter into the bath, as set forth.

In testimony whereof I have signed my name to this specification in the presence of two subscribing witnesses.

ANTONIO CASADEY.

Witnesses:
CHARLES E. FOSTER,
JOHN WHITE.